March 3, 1970     R. W. CHERRINGTON     3,498,625
APPARATUS MAINTAINING TILT OF POTATO HARVESTER CONVEYOR
Filed Oct. 5, 1967     4 Sheets-Sheet 3

INVENTOR.
ROGER W. CHERRINGTON
BY
ATTORNEYS

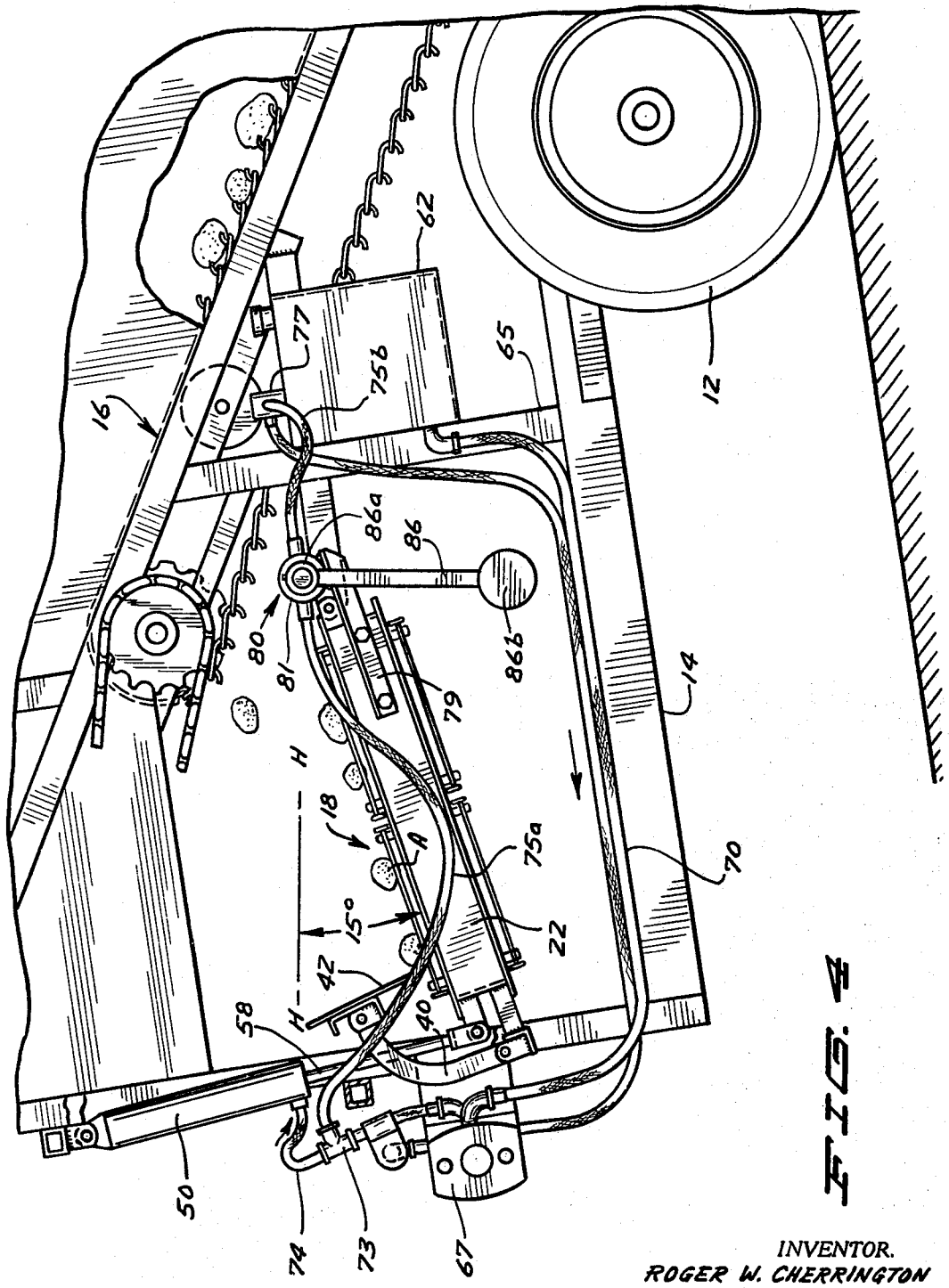

United States Patent Office 3,498,625
Patented Mar. 3, 1970

3,498,625
APPARATUS MAINTAINING TILT OF POTATO HARVESTER CONVEYOR
Roger W. Cherrington, Pine City, Minn., assignor to Dahlman Manufacturing & Sales, Inc., Braham, Minn., a corporation of Minnesota
Filed Oct. 5, 1967, Ser. No. 673,186
Int. Cl. B62d 37/00
U.S. Cl. 280—6.1            2 Claims

ABSTRACT OF THE DISCLOSURE

This invention concerns an apparatus controlling the lateral tilt of a separating apron of a potato harvester and consists of a hydraulic cylinder having its ram pivotally supporting said apron, a valve controlling the pressure of fluid supplied to said cylinder and a gravity responsive member operating said valve to increase or decrease the pressure within said cylinder to raise or lower said apron to compensate for the up grade or down grade travel of said harvester to maintain the tilt of said apron constant to the horizontal.

BACKGROUND OR SUMMARY OF THE INVENTION

Figure 1:
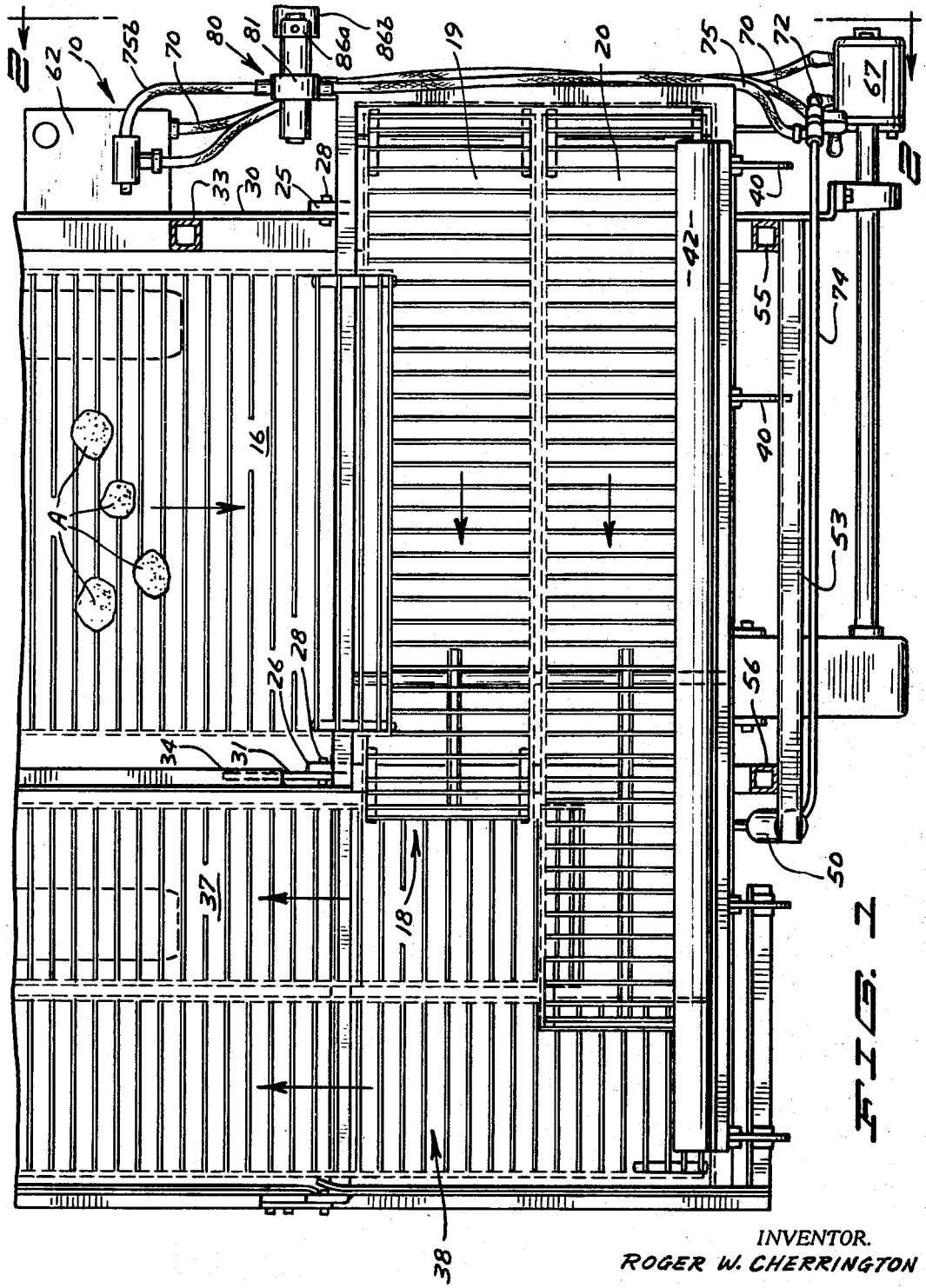

The invention relates to an apparatus for controlling the lateral angle of tilt of a separating apron in connection with a potato harvester. It is desirable to maintain such an apron at a certain constant angle of tilt at which potatoes by rolling or tumbling will separate from stones and clods of dirt.

Known in the art are longitudinally inclined conveyors for separating articles and also laterally inclined conveyors, but manually operable means are required to adjust the angle of tilt of such conveyors to compensate for upward or downward travel of the harvester.

The essential novelty and an object of the invention herein is to provide a transverse apron for a potato harvester with respect to which a predetermined angle of tilt for separation of potatoes will be maintained automatically.

It is another object of this invention to provide in connection with the above object, means which automatically compensate for upward and downward travel of a harvester in maintaining said separating apron at a constant angle of tilt with respect to the horizontal.

It is a further object of the invention above set forth to provide a pressure actuated means to pivotally support a separating apron and means automatically adjusting said pressure to pivot said apron to compensate for upward and downward movement of the potato harvester to maintain constant to the horizontal the predetermined angle of tilt of said apron.

It is more specifically an object of the invention herein to provide a hydraulic cylinder and a ram, said cylinder having a certain pressure of fluid therein to pivotally support a transverse separating apron at a predetermined angle of lateral tilt by means of said ram, a valve in connection with a pump and a fluid supply controlling the pressure to said cylinder and a member readily responsive to gravity automatically causing changes in said pressure to compensate for upward and downward movement of the harvester to support said apron constantly as its predetermined angle of lateral tilt with respect to the horizontal.

Figure 2:
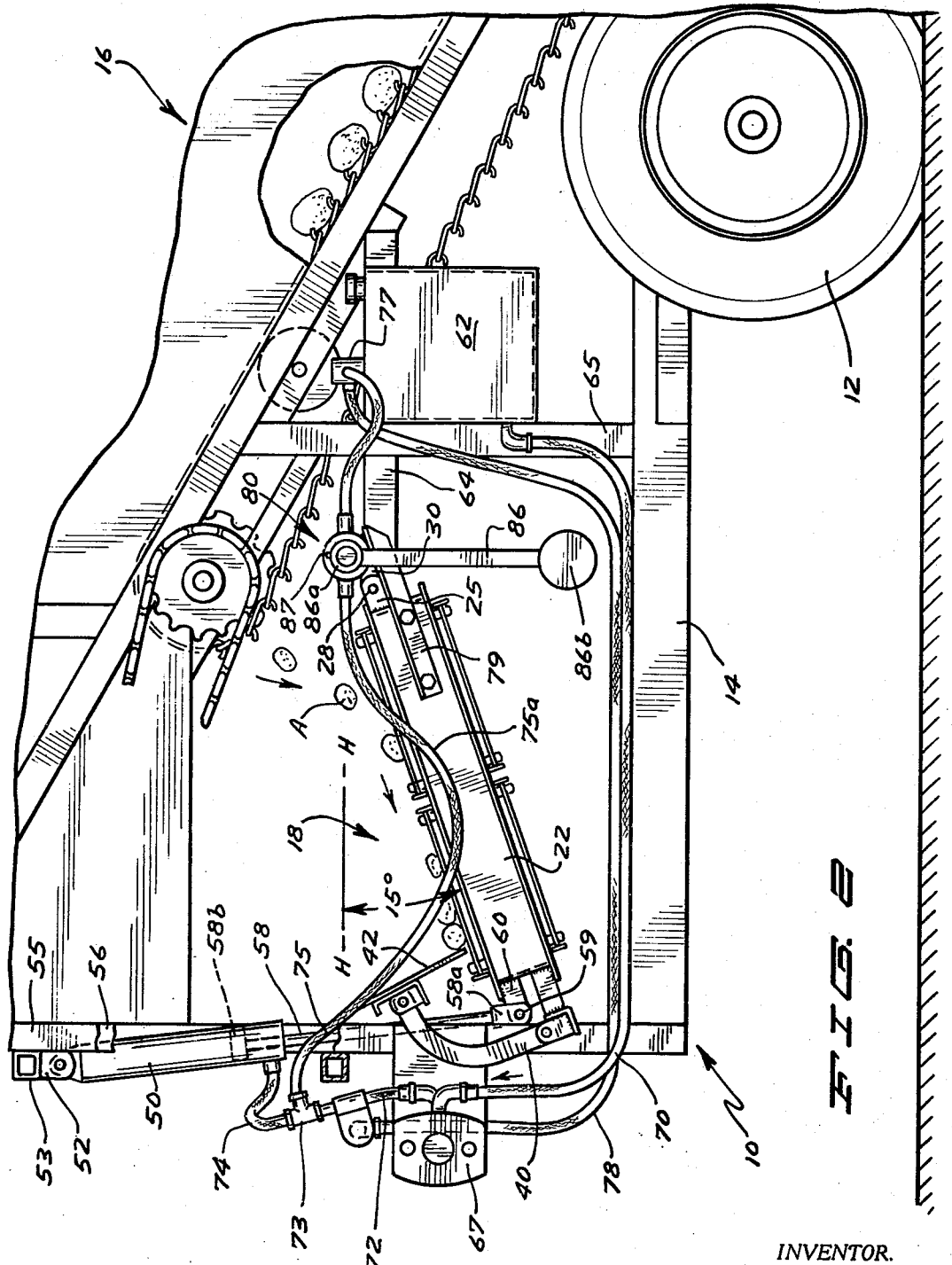
Figure 3:
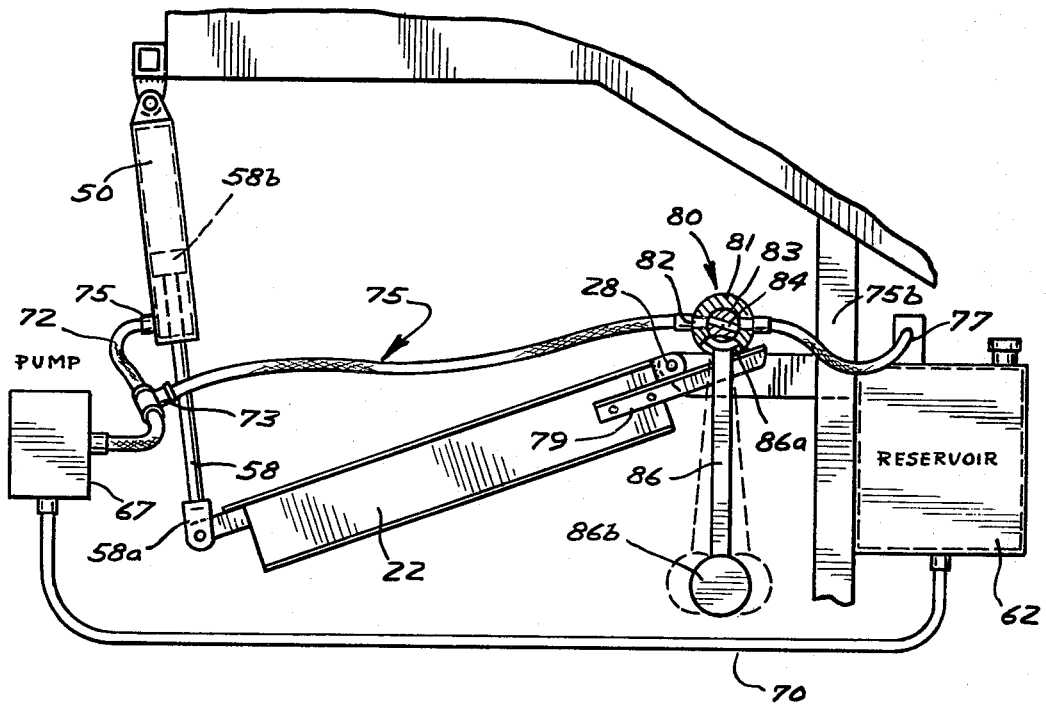
Figure 5:
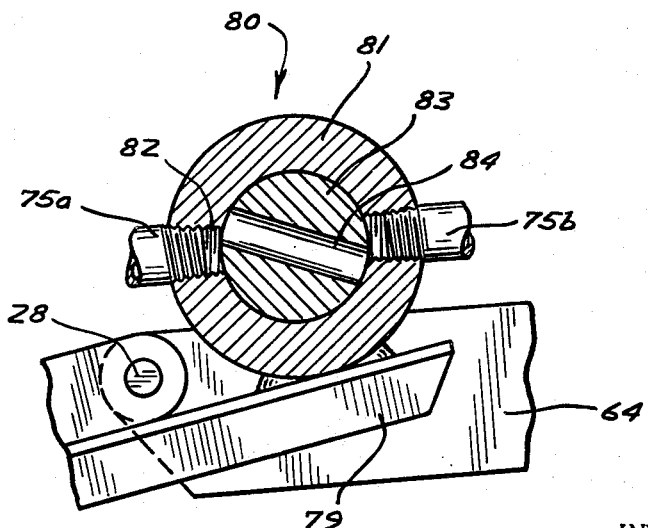

These and other objects and advantages of the invention will be set forth in the following description made in connection with the accompanying drawings in which like reference characters refer to similar parts throughout the several views and in which:

FIG. 1 is a broken top plan view with some portions thereof being shown in section;
FIG. 2 is a broken view in side elevation taken on line 2—2 of FIG. 1 as indicated;
FIG. 3 is a broken diagrammatic view in elevation with a portion thereof in section showing the operating apparatus comprising the invention;
FIG. 4 is a broken view in side elevation similar to that of FIG. 2 showing the apparatus in an inclined position; and
FIG. 5 is a fragmentary enlarged view in section of a detail of the apparatus.

DESCRIPTION OF A PREFERRED EMBODIMENT

With reference to the drawings, the numeral 10 indicates a potato harvester generally and only as much of the structure of the harvester is shown as is necessary to support and disclose the subject matter of the invention herein. The harvester may be a tractor mounted self propelled vehicle or a pulled type of vehicle and will be of conventional construction familiar to one skilled in the art.

Wheels 12 are shown supporting a base frame structure 14. Carried upon the frame structure is a longitudinal elevating conveyor 16 receiving material A comprising stones, clods of dirt and potatoes from the diggers not shown.

Said elevating conveyor 16 discharges onto a split cross or transverse separating conveyor or apron 18 comprising individual conveyors 19 and 20 carried on the same basic frame or supporting structure 22. At the side underlying the discharge end of said conveyor, a pair of studs 25 and 26 extend from the adjacent portion of the frame 22 and are pivoted by pivot members 28 to arms 30 and 31 extending from upstanding frame members 33 and 34. The frame 22 carries the conventional sprockets and link chains which make up the individual conveyor separating aprons 19 and 20.

The apron 19 discharges stones and clods of dirt onto a longitudinal elevating trash conveyor 37 and the apron 20 discharges potatoes onto the elevating potato receiving conveyor 38. The potatoes will be unloaded from the harvester in a conventional manner.

Extending upwardly from the frame 22 at the outer side of the apron 20 and spaced therealong are a plurality of upstanding inwardly curved fingers 40 which hold a vertically disposed somewhat resilient wall member 42 extending substantially the full length of said apron 20 to serve as a retaining board or wall to prevent potatoes from moving over the side thereof.

The separating conveyor or apron 18 by means of its basic frame 22 carries the conveyors 19 and 20 as an integral structure. To cause a separation of potatoes from stones and clods of dirt, the apron 18 is laterally tilted at a certain suitable predetermined angle at which the potatoes will roll or tumble on the conveyor 20 and stones and clods of dirt which are not as subject to tumbling and rolling as potatoes are at the chosen angle of tilt, will for the most part remain on the conveyor 19. Some stones and clods may get onto the conveyor 20 but a very substantial separation is effected.

The harvester will travel up and down grade in moving across fields harvesting the crop and such movement of the harvester will have a bearing on the angle of tilt of the apron. The following apparatus described and which represents the substance of the invention herein automatically maintains said apron 18 constant at its predetermined angle of tilt with respect to the horizontal.

A hydraulic cylinder 50 is shown pivoted at one end to a stud 52 depending from a frame member 53 carried by an upstanding frame member 56. Extending from said cylinder is a ram 58 forming an actuating member having a bifurcated end 58a secured by a pin 59 to a stud 60 projecting from the outer side of said apron frame 22. Said ram carries a piston 58b at its end portion within said cylinder 50. Thus said cylinder with its ram pivotally supports the free or rear side portion of said apron 18.

In connection with said cylinder, a reservoir or tank 62 of hydraulic fluid is provided. Said tank is shown carried by a cross bar 64 secured as by welding to an upright frame member 65. In connection with said cylinder and tank is a pump 67 of conventional design and of which detail structure is not shown.

Running from said tank 62 to said pump 67 is an uninterrupted fluid supply line 70. Running from the pressure side of said pump 67 is a short pressurized supply line 72 terminating in a T fitting 73. Running from said T fitting to said cylinder is a pressurized supply line 74. Running from said T fitting 73 to said tank is a pressurized return line 75 which communicates with said tank through a fitting 77. Said line 75 is interrupted by a spool valve 80. Said valve 80 has its housing or body portion 81 mounted on and secured to an arm 79 projecting from said frame 22 and is here shown positioned somewhat beyond the pivotal axis of said apron 18. The portion 75a of said line 75 runs from said T member 73 to said valve 80 and the portion 75b of said line 75 runs from said valve to said tank 62. Line 75 is a flexible line having some slack therein. A bypass line 78 is shown running from the tank 62 to communication with the line 72.

With reference to FIG. 3 giving a diagrammatic showing of said valve 80 and its related structure, said valve housing or body portion 81 is cylindrical forming an axial bore therein and having a diametrical or transverse passage 82 extending therethrough in full communication with each portion of said fluid line 75. A core or spool 83 is rotatably disposed within the bore of said housing 81 and has a passage 84 therethrough adapted to be aligned with said passage 82 for full communication therewith or for restricted communication therewith by relative rotation therebetween. An elongated depending arm 86 serving on the order of a pendulum having a weighted lower end portion 86b is secured to an axially extended portion of said spool 83 by having the same received within a collar 86a formed at the upper end portion of said arm 86. Said collar will be tapped to receive a set screw 87 to fix the relative rotational positions of said spool and said arm with respect to the alignment of said passage 84 with said passage 82. This will be further described. Said end portion 86b will be sufficiently weighted to maintain said arm in a vertical position normal to a horizontal pane which position is maintained by the responsiveness of said weighted portion to the force of gravity.

OPERATION

For operation of said harvester on level ground, the separating apron 18 will be set at a lateral angle of tilt which will cause the maximum separation of potatoes from stones and clods of dirt. This will vary with soil or ground conditions. A good average angle of tilt for said apron for maximum separation of potatoes is on the order of fifteen degrees. The apron may be set and maintained at any desired predetermined angle of tilt. The angle of tilt is with reference to the horizontal which is indicated by the reference lines H-H as shown in FIGS. 2 and 4. There will be just sufficient hydraulic fluid pressure in the cylinder 50 to maintain the ram 58 in sufficient extended position to support the free side of the conveyor at the desired angle of tilt.

The hydraulic system will be in continuous operation. The pressure in the cylinder 50 is governed by the back pressure from the valve 80.

The spool 83 will be positioned with its passage 84 in partial nonalignment with the passage 83 forming a restriction therebetween whereby back pressure is created in the line portion 75a running to the cylinder 50 through the line 74. Thus the valve 80 is initially calibrated or set to provide the degree of back pressure necessary to maintain said apron at the desired angle of tilt for a level ground operation. With the spool 83 thus positioned, the arm in a vertically disposed position is secured to said spool by means of the set screw 87 through the collar 86a. This angle of tilt will be maintained constant with respect to the horizontal. At said angle there is an equilibrium established between the angle of tilt and the effective pressure in the hydraulic system.

With the harvester in operation and as indicated in FIG. 4, moving upwardly, the housing of said valve 80 will be partially rotated counter-clockwise in effect by such up grade movement. The arm 86 will maintain its vertical position constant. Thus there will be a change in the relative positions of the passages 82 and 84. With an upward movement of the harvester, the valve housing 81 will in effect rotate rearwardly or counter-clockwise and with the spool 83 maintaining its radial position constant with respect to the horizontal, the passages 82 and 84 will tend away from one another in the direction of greater misalignment or greater restriction therebetween and thus the communication between the two passages will be more restricted than initially. This is indicated by the enlarged showing of the valve 80 in FIG. 5. As a result, a greater back pressure is generated within the line 75a which extends to within the cylinder 50 lifting the piston 58a and retracting the ram 58. Thus the apron 18 is pivoted upwardly to compensate for the upward travel of the harvester. Movement of the apron restores the housing 81 to its original position relative to the spool 83. The passages 82 and 84 are restored to their initial positions. The initial equilibrium between the tilt of the apron and the back pressure in the line 75 is thus restored. In this way the apron is maintained at an angle of tilt which is constant to the horizontal. An opposite action results with respect to the passages 82 and 84 when the harvester travels down grade. In this case, pressure is reduced in said cylinder and the ram is extended to maintain said apron constant with respect to the horizontal. The restoring action of the valve 80 acts constantly so that actually the apron does not change its angular position.

The valve 80 in bringing about compensation to upward and downward travel of a harvester is sensitive to small changes in upward or downward travel of the harvester such as changes in grade of one to two percent with respect to the horizontal. The initial setting of the valve 80 is a matter of adjustment to establish an equilibrium between the desired angle of apron tilt and the back pressure required to maintain such a tilt with respect to the cylinder 50.

It is noted that the valve 80 is mounted on the piece of apparatus which is to be maintained in a controlled position which in the instant case is the separation apron 18. The valve housing in effect moves rotationally as the harvester travels up or down grade. The spool 83 remains in a constant position under the influence of the arm 86. Thus the movement of the harvester causes the change in relationship of alignment between the passages 82 and 84 which automatically changes the pressure acting on the piston within the cylinder 50. This will retract or extend the ram 58, as the case may be, to bring the apron back to its initial angle of tilt with respect to the horizontal. The movement of the ram and the corresponding movement of the apron moves the valve housing and its passage to its initial position with respect to the spool and its passage. The compensation effected is so responsive to change in grade of the travel of the harvester that for practical purposes the angle of tilt of the apron is maintained constant to the horizontal. The valve housing is returned to its initial position with respect to the spool 83. The back pressure created at the valve 80 is in the nature of a differential pressure with respect to the line pressure at the pump in providing the effective pressure within the cylinder 50. A predetermined differential pressure establishes equilibrium with respect to the desired angled position of the apron.

Thus it is seen that there has been provided a simple and effective apparatus for a potato harvester to maintain a separation apron at a constant angle of tilt with respect to the horizontal.

It will of course be understood that various changes may be made in the form, details, arrangement and proportions of the parts, without departing from the scope of the invention herein which, generally stated, consists in an apparatus capable of carrying out the objects above set forth, in the parts and combinations of parts disclosed and defined in the appended claims.

What is claimed is:

1. An apparatus in connection with a potato harvester for automatically maintaining an apron at a constant angle of tilt with reference to the horizontal, having in combination, a framework, an apron laterally pivotally mounted at one side thereof onto said framework, a hydraulic cylinder having a ram holding the free side of said apron to tilt said apron at a certain angle with reference to the horizontal, means automatically actuating said cylinder to maintain said apron at said angle, said means comprising a pressurized line of fluid running to said cylinder, a second line in free communication with said line running to a fluid reservoir, and restricting means intermediate said second line creating a pressure differential with respect to the pressure of said pressurized line to create an equilibrium between the pressure of said cylinder and the position of said cylinder to maintain constant said angle of tilt of said apron, said restricting means compensating for upward or downward movement of said harvester with respect to the position of said apron, said restricting means comprising a valve housing mounted to be movable with said apron and having free passage therethrough for said second line, a freely rotating body within said housing having a passage therethrough alignable with said passage through said housing, said rotating body being rotatively positioned to have its passage misaligned with reference to said passage of said housing to such an extent as to create said pressure differential, and a gravity responsive member integral with said rotating body holding the same constant in its given position with respect to the horizontal.

2. An apparatus in connection with a potato harvester for automatically maintaining an apron at a constant angle of tilt with reference to the horizontal, having in combination, a framework, a laterally pivotally mounted apron carried by said framework transversely of said harvester, adjustable means carried by said framework holding said apron tilted laterally at a certain predetermined angle with reference to the horizontal, and means establishing an equilibrium with said adjustable means and said apron at said angle of tilt, said means being arranged and constructed to reestablish said equilibrium automatically upon its being upset by upward and downward movement of said harvester, said adjustable means comprising a fluid pressure actuated device, said means comprising a pressurized line running to said adjustable means, a second pressurized line being in full communication with said first mentioned pressurized line, a valve housing intermediate said second pressurized line having a free passage therethrough for said second line, a freely rotating body within said valve housing restricting said passage to create a pressure differential with respect to said pressurized line, said body being positioned to establish an equilibrium between said adjustable means and the angle of tilt of said apron, and gravity responsive means integral with said body holding the same constant as positioned, said housing being movable with said apron whereby changes in said pressure differential by movement of said housing are automatically restored to said position of equilibrium between said adjustable means and said apron.

References Cited

UNITED STATES PATENTS

| | | | |
|---|---|---|---|
| 2,854,138 | 9/1958 | Sheard | 280—6.1 X |
| 2,872,200 | 2/1959 | Kroll | 280—6.1 |
| 3,033,584 | 5/1962 | Carmichael | 280—6.1 |

PHILIP GOODMAN, Primary Examiner